(No Model.)
M. C. OVIATT.
BICYCLE WHEEL.
No. 603,574.  Patented May 3, 1898.
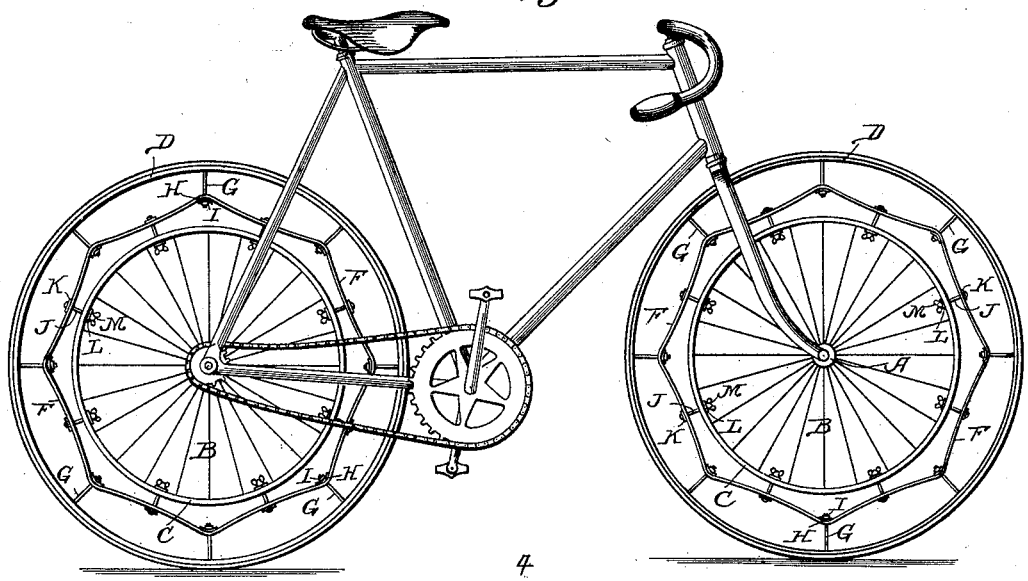
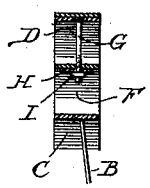
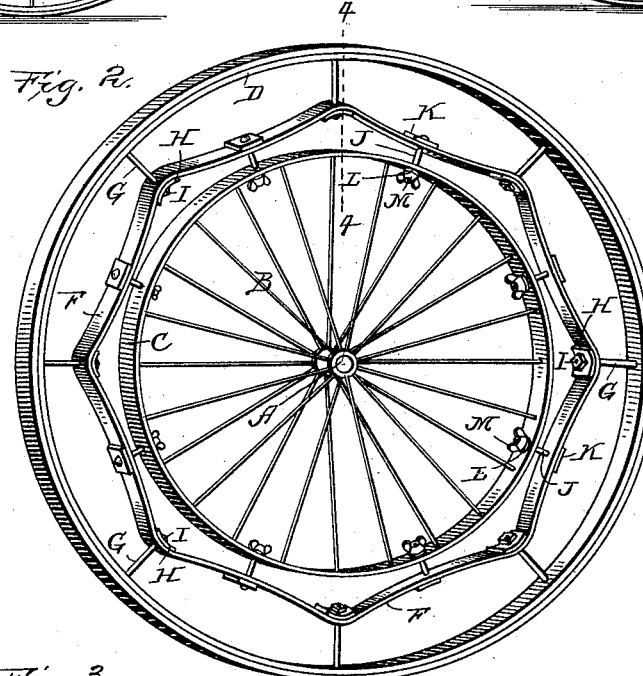
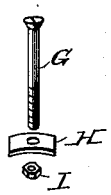
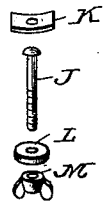
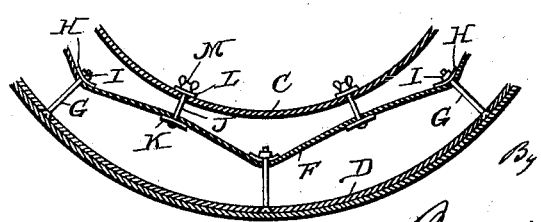
Witnesses
Inventor
M. C. Oviatt,
By his Attorneys,
Baldwin, Davidson & Wight.
THE NORRIS PETERS CO., PHOTO-LITHO., WASHINGTON, D. C.

UNITED STATES PATENT OFFICE.

MOSEMAN C. OVIATT, OF TRAVERSE CITY, MICHIGAN.

BICYCLE-WHEEL.

SPECIFICATION forming part of Letters Patent No. 603,574, dated May 3, 1898.

Application filed August 31, 1897. Serial No. 650,145. (No model.)

*To all whom it may concern:*

Be it known that I, MOSEMAN C. OVIATT, a citizen of the United States, residing at Traverse City, in the county of Grand Traverse and State of Michigan, have invented certain new and useful Improvements in Vehicle-Wheels, of which the following is a specification.

The object of my invention is to provide a wheel suitable for use in vehicles generally, but especially adapted for velocipedes, and particularly bicycles. Generally such wheels are provided with pneumatic tires; but such tires, so far as I am aware, have never yet been so made that they are not liable to puncture. It has been proposed to give the necessary or desirable "spring" to wheels of this class by providing inner and outer rims connected together by spring-bands and to employ on the outer rim a tire of leather, solid rubber, or other suitable material.

According to my invention I construct a wheel with outer and inner rims and interpose between the rims a flexible elastic band which while not directly in contact with either rim is connected therewith at suitable distances by bolts or rods. This mode of constructing a wheel I believe to be entirely new and is claimed by me broadly as my invention.

My invention also involves improved devices for connecting the flexible elastic band with the rims.

These details are shown in the drawings, and will be hereinafter particularly described.

Figure 1 of the accompanying drawings is a side elevation of a bicycle equipped with wheels made in accordance with my invention. Fig. 2 is a perspective view, on an enlarged scale, of one of the wheels detached. Fig. 3 is a detail view in section of a portion of the rims and a flexible elastic band, and this figure shows also the devices preferably employed for attaching the band to the rims. Fig. 4 is a detail view in section on the line 4 4 of Fig. 2. Fig. 5 is a detail view in perspective of one set of devices used for connecting the flexible band with the outer rim. Fig. 6 is a similar view of one set of devices used for connecting the band with the inner rim.

The wheel is provided with two rims—an inner rim C and an outer rim D. The inner rim C is connected with the hub A by the spokes B. Any suitable material may be used for forming these parts. Around the outer rim D is secured a tire made of leather, rubber, or other suitable material. Between the rims C and D is arranged a band F of flexible material, preferably steel. The band F is connected with the outer rim D by means of screw bolts or rods G, which are provided with heads to fit the openings in the rim D. The bolts pass through the band F and through curved washers H, which are placed on the inside of the ring, and nuts I are employed for holding the washers in place. The band F is connected to the inner rim C by means of bolts or rods J, which pass first through curved washers K, placed on the outside of the band, and then through the band and the inner rim C. The screw-threaded ends of the bolts or rods J project beyond the inner side of the rim C sufficiently to receive rubber washers L and nuts M.

In assembling the parts of the wheel the band F may be first connected with the outer rim by the bolts or rods G and the nuts I may be turned or tightened until the band F is stretched tight. The bolts J may then be inserted, and the nuts may be tightened to give the desired tension to the band.

It will be observed that the nuts M and I when screwed home tend to pull the band F in opposite directions, and that the band F is held between the rims C and D, but out of contact therewith. The effect of tightening the nuts is to bend the band in different sections. For instance, one section of the band is secured to the outer rim by means of two bolts G, while one bolt J secures this section of the band to the inner rim. Therefore the bolt J, which is arranged centrally between the bolts G, will tend to bend the section of the band with which it is connected inwardly toward the inner rim.

The load placed upon the vehicle provided with my improved wheels will be suspended from the outer rim in the same manner as the weight is suspended from the upper portion of the rim of any vehicle provided with flexible spokes. The only connection between the outer rim and the inner rim is through the medium of the flexible band F. The load borne by the vehicle will therefore be borne by the flexible band, which may, as before described, be given a degree of tension commensurate with the amount of load to be carried by the vehicle.

While I have illustrated and described the best way now known to me for carrying out my invention, I do not restrict myself to the details of construction shown and described, as it is obvious that changes may be made without departing from the novel features of my invention. The subject-matter deemed by me to be novel is set forth in the claims.

I claim as my invention—

1. A vehicle-wheel, comprising inner and outer rims, a flexible band interposed between the two rims but not touching them, and adapted to move toward and from the rims, devices connecting the band with both the rims, and means for adjusting the tension of the band by moving it radially at different points throughout its length toward or from the center of the wheel.

2. A vehicle-wheel, comprising inner and outer rims, a flexible band interposed between the two rims but not touching them and free to move radially toward and from the rims, radial bolts or rods for holding the band in place, and means applied to the bolts for moving the band at different points throughout its length radially to adjust the tension thereof.

3. A vehicle-wheel provided with inner and outer rims, a flexible band interposed between the two rims, bolts passing inward from the outer rim to connect it with the band, curved washers on said bolts inside the band, and nuts on the bolts bearing on said washers, substantially as described.

4. A vehicle-wheel, comprising inner and outer rims, a flexible band interposed between the two rims, bolts connecting the band with the outer rim, curved washers on the ends of the bolts, nuts secured to the bolts and holding the washers against the band, bolts connecting the flexible band with the inner rim, curved washers against which the heads of the bolts bear, nuts on the screw-threaded ends of said last-mentioned bolts, and elastic washers interposed between the nuts and the inner rim.

MOSEMAN C. OVIATT.

Witnesses:
 Roy Thompson,
 Leon F. Titus.